US009460014B2

(12) United States Patent
Cudak et al.

(10) Patent No.: US 9,460,014 B2
(45) Date of Patent: *Oct. 4, 2016

(54) SHARING LOCAL CACHE FROM A FAILOVER NODE

(71) Applicant: LENOVO ENTERPRISE SOLUTIONS (SINGAPORE) PTE. LTD., Singapore (SG)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 210 days.

This patent is subject to a terminal disclaimer.

(21) Appl. No.: 13/960,049

(22) Filed: Aug. 6, 2013

(65) Prior Publication Data
US 2015/0039718 A1  Feb. 5, 2015

Related U.S. Application Data

(63) Continuation of application No. 13/956,596, filed on Aug. 1, 2013.

(51) Int. Cl.
*G06F 12/08* (2016.01)
*G06F 11/20* (2006.01)
*G06F 12/12* (2016.01)

(52) U.S. Cl.
CPC ......... *G06F 12/084* (2013.01); *G06F 11/2025* (2013.01); *G06F 11/2038* (2013.01); *G06F 11/2043* (2013.01); *G06F 11/2046* (2013.01);

(Continued)

(58) Field of Classification Search
CPC ... G06F 12/084; G06F 12/0891; G06F 12/12
See application file for complete search history.

(56) References Cited

U.S. PATENT DOCUMENTS

| 5,394,555 A | 2/1995 | Hunter et al. |
| 7,162,579 B2 | 1/2007 | Horn et al. |

(Continued)

OTHER PUBLICATIONS

Nayfeh, B., et al., "The Impact of Shared-Cache Clustering in Small-Scale Shared-Memory Multiprocessors", Proceedings, Second International Symposium on High-Performance Computer Architecture, Feb. 1996, pp. 74-84, IEEE Xplore Digital Library, DOI : 10.1109/HPCA.1996.501175.

(Continued)

*Primary Examiner* — Yong Choe
(74) *Attorney, Agent, or Firm* — Brandon C. Kennedy; Katherine S. Brown; Kennedy Lenart Spraggins LLP

(57) ABSTRACT

Sharing local cache from a failover node, including: determining, by a managing compute node, whether a first compute node and a second compute node each have a local cache, where the second compute node is a mirrored copy of the first compute node; responsive to determining that the first compute node and the second compute node each have a local cache, combining, by the managing compute node, local cache on the first compute node and local cache on the second compute node into unified logical cache; receiving, by the managing compute node, a memory access request; and sending, by the managing compute node, the memory access request to an appropriate local cache in the unified logical cache.

3 Claims, 4 Drawing Sheets

(52) U.S. Cl.
CPC ....... *G06F 12/0871* (2013.01); *G06F 11/2097* (2013.01); *G06F 12/12* (2013.01); *G06F 2212/1032* (2013.01); *G06F 2212/286* (2013.01); *G06F 2212/311* (2013.01)

(56) References Cited

U.S. PATENT DOCUMENTS

| | | |
|---|---|---|
| 7,321,986 B2 | 1/2008 | Ash et al. |
| 7,437,386 B2 | 10/2008 | Callahan et al. |
| 7,496,646 B2 | 2/2009 | Casper et al. |
| 7,676,635 B2 | 3/2010 | Newport et al. |
| 7,975,169 B2 | 7/2011 | Ash et al. |
| 7,978,631 B1 | 7/2011 | Abdelaziz et al. |
| 2009/0240869 A1 | 9/2009 | O'Krafka et al. |
| 2012/0221795 A1 | 8/2012 | Hoshaku et al. |
| 2014/0059292 A1* | 2/2014 | Phelan et al. ............. 711/113 |

OTHER PUBLICATIONS

Wan, S., et al., "Victim Disk First: An Asymmetric Cache to Boost the Performance of Disk Arrays under Faulty Conditions", Proceedings of the 2011 USENIX Annual Technical Conference (USENIXATC'11), Jun. 2011, pp. 1-13, USENIX Association, Berkeley, CA, USA.

Thomasian, A., et al., "Mirrored Disk Scheduling Methods with a Non-Volatile Shared Cache", Aug. 2011, pp. 1-22, URL: http://citeseerx.ist.psu.edu/viewdoc/summary?doi=10.1.1.89.9816.

* cited by examiner

SHARING LOCAL CACHE FROM A FAILOVER NODE

CROSS-REFERENCE TO RELATED APPLICATION

This application is a continuation application of and claims priority from U.S. patent application Ser. No. 13/956,596, filed on Aug. 1, 2013.

BACKGROUND OF THE INVENTION

1. Field of the Invention

The field of the invention is data processing, or, more specifically, methods, apparatus, and products for sharing local cache from a failover node.

2. Description of Related Art

Modern computing systems can include a plurality of compute nodes. In such systems, mirroring compute nodes can result in poor use of total system resources as some portion of the total system resources are only used to copy other system resources and are not used in active data processing operations.

SUMMARY OF THE INVENTION

Methods, apparatuses, and products for sharing local cache from a failover node, including: determining, by a managing compute node, whether a first compute node and a second compute node each have a local cache, where the second compute node is a mirrored copy of the first compute node; responsive to determining that the first compute node and the second compute node each have a local cache, combining, by the managing compute node, local cache on the first compute node and local cache on the second compute node into unified logical cache; receiving, by the managing compute node, a memory access request; and sending, by the managing compute node, the memory access request to an appropriate local cache in the unified logical cache.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
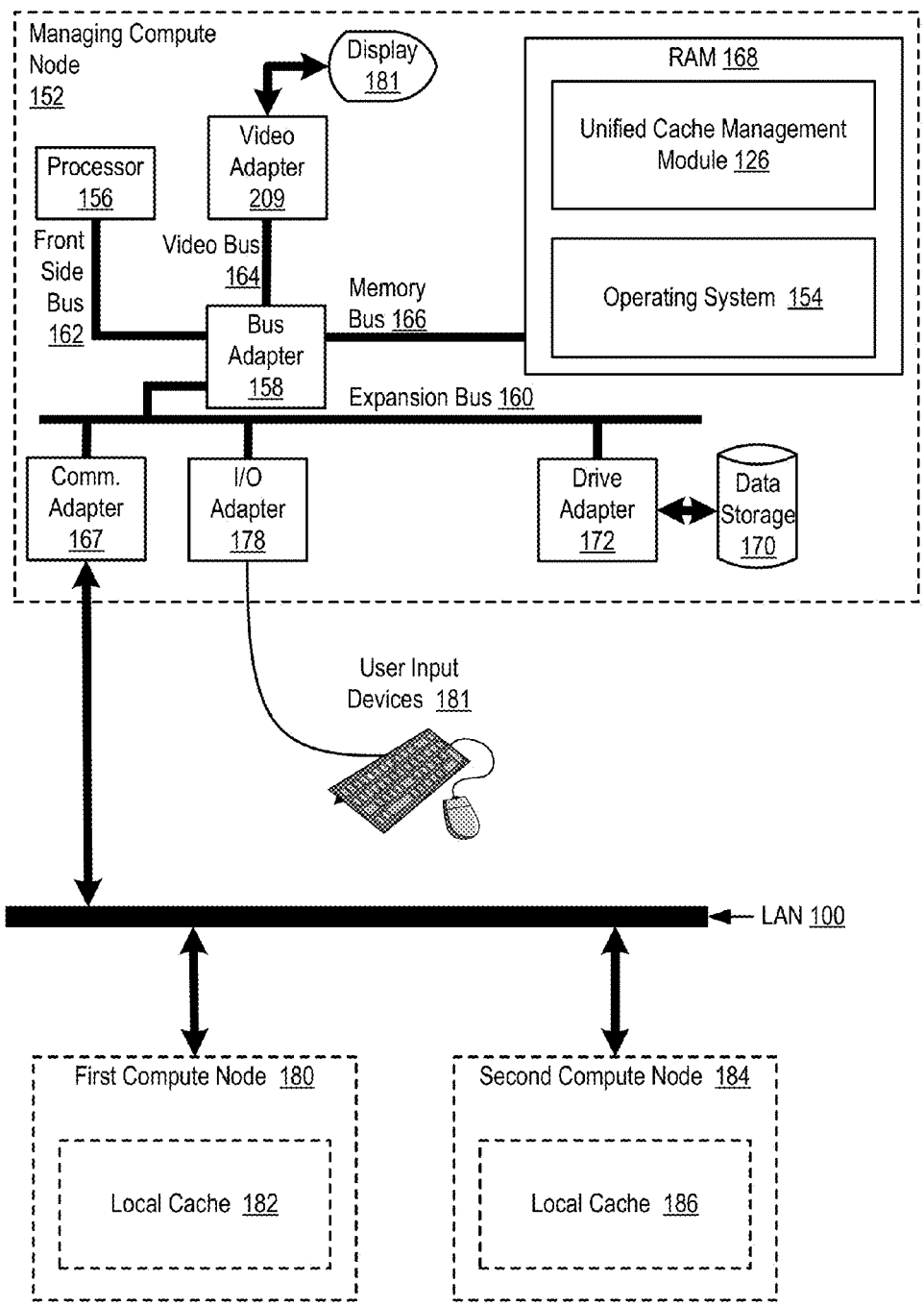
FIG. 1 sets forth a block diagram of automated computing machinery comprising an example managing compute node useful in sharing local cache from a failover node according to embodiments of the present invention.

Example methods, apparatus, and products for sharing local cache from a failover node in accordance with the present invention are described with reference to the accompanying drawings, beginning with FIG. 1. FIG. 1 sets forth a block diagram of automated computing machinery comprising an example managing compute node (152) useful in sharing local cache from a failover node according to embodiments of the present invention. The managing compute node (152) of FIG. 1 includes at least one computer processor (156) or 'CPU' as well as random access memory (168) ('RAM') which is connected through a high speed memory bus (166) and bus adapter (158) to processor (156) and to other components of the managing compute node (152).

Stored in RAM (168) is a unified cache management module (126), a module of computer program instructions for sharing local cache from a failover node according to embodiments of the present invention. The unified cache management module (126) of FIG. 1 may be configured to share local cache from a failover server by: determining whether a first compute node (180) and a second compute node (184) each have a local cache (182, 186), where the second compute node (184) is a mirrored copy of the first compute node (180); responsive to determining that the first compute node (180) and the second compute node (184) each have a local cache (182, 186), combining local cache (182) on the first compute node (180) and local cache (186) on the second compute node (184) into unified logical cache; receiving a memory access request; and sending the memory access request to an appropriate local cache (182, 186) in the unified logical cache.

Also stored in RAM (168) is an operating system (154). Operating systems useful sharing local cache from a failover node according to embodiments of the present invention include UNIX™ Linux™ Microsoft XP™ AIX™ IBM's i5/OS™ and others as will occur to those of skill in the art. The operating system (154) and the unified cache management module (126) in the example of FIG. 1 are shown in RAM (168), but many components of such software typically are stored in non-volatile memory also, such as, for example, on a disk drive (170).

The managing compute node (152) of FIG. 1 includes disk drive adapter (172) coupled through expansion bus (160) and bus adapter (158) to processor (156) and other components of the managing compute node (152). Disk drive adapter (172) connects non-volatile data storage to the managing compute node (152) in the form of disk drive (170). Disk drive adapters useful in computers for sharing local cache from a failover node according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example managing compute node (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example managing compute node (152) of FIG. 1 includes a video adapter (209), which is an example of an I/O adapter specially designed for graphic output to a display device (181) such as a display screen or computer monitor. Video adapter (209) is connected to processor (156) through a high speed video bus (164), bus adapter (158), and the front side bus (162), which is also a high speed bus.

The example managing compute node (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for sharing local cache from a failover node according to embodiments of the present invention include modems for wired dial-up communications, Ethernet (IEEE 802.3) adapters for wired data communications network communications, and 802.11 adapters for wireless data communications network communications.

Figure 2:
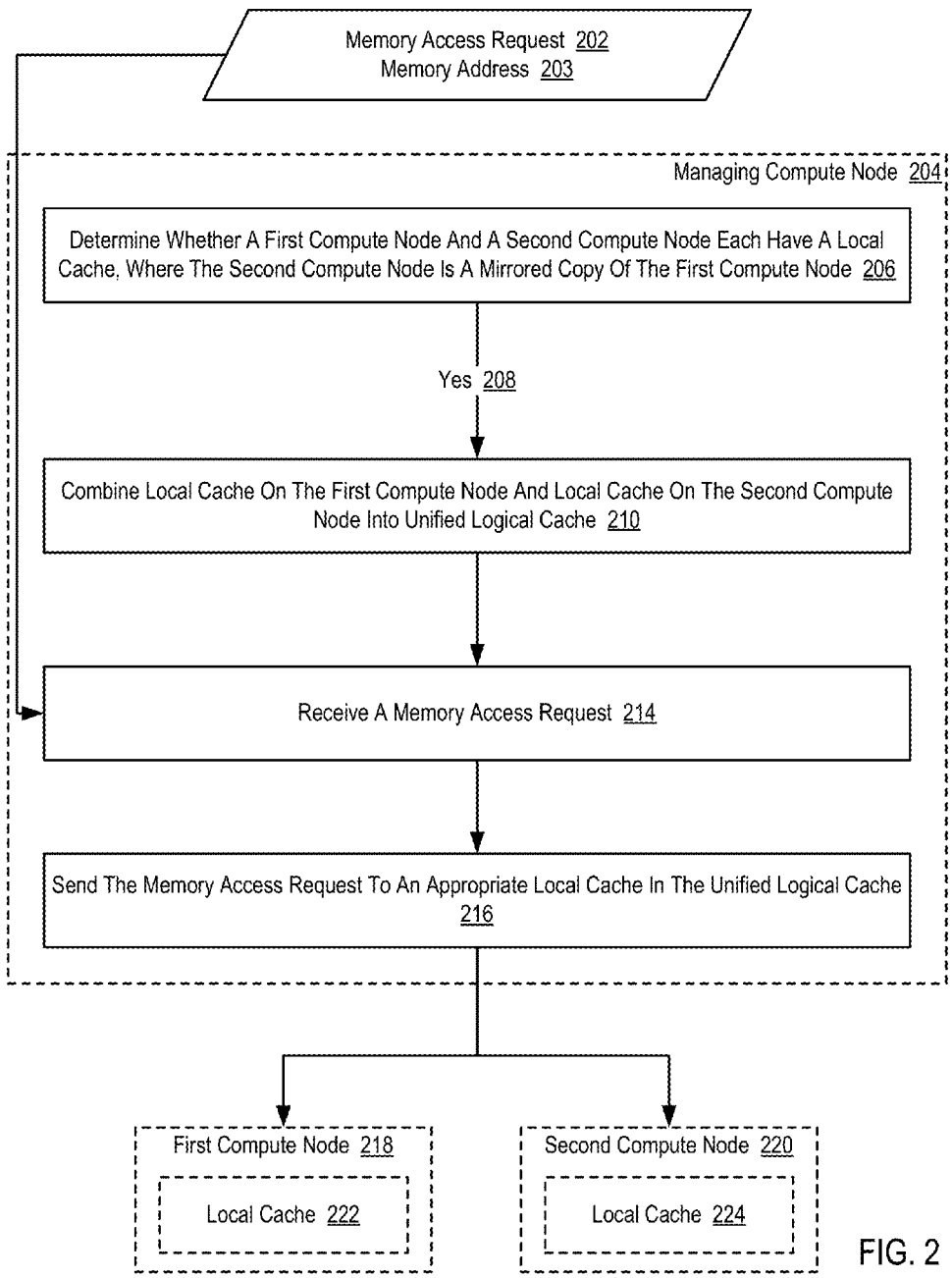
FIG. 2 sets forth a flow chart illustrating an example method for sharing local cache from a failover node according to embodiments of the present invention.

For further explanation, FIG. 2 sets forth a flow chart illustrating an example method for sharing local cache from a failover node according to embodiments of the present invention. In the example method of FIG. 2, a failover node represents a compute node that is part of a cluster of compute nodes. Under normal operating conditions, the failover node may not participate in active data processing operations carried out by other compute nodes in the cluster. If another compute node in the cluster that does participate in active data processing operations fails, however, the active data processing operations carried out by the failed node may be carried out by the failover node. In such a way, the failover node represents a backup node that may be utilized if other nodes in the cluster fail.

The example depicted in FIG. 2 includes a first compute node (218) and a second compute node (220). In the example method of FIG. 2, the second compute node (220) is a mirrored copy of the first compute node (218) such that the second compute node (220) serves as a failover node for the first compute node (218). Because the second compute node (220) is a mirrored copy of the first compute node (218), the second compute node (220) can have computer hardware that is in the same state as computer hardware on the first compute node (218). For example, the second compute node (220) may have a hard disk that has the same contents as a hard disk in the first compute node (218), the second compute node (220) may include processor registers that have the same contents as processor registers in the first compute node (218), and so on.

The example depicted in FIG. 2 also includes a managing compute node (204). The managing compute node (204) of FIG. 2 may be coupled for data communications with the first compute node (218) and the second compute node (220). The managing compute node (204) may be further configured to carry out various management operations for the pair of compute nodes (218, 220). In the example method of FIG. 2, the managing compute node (204) may include computer program instructions for ensuring that the second compute node (220) remains a mirrored copy of the first compute node (218), computer program instructions for directing active data processing operations to the first compute node (218), computer program instructions for detecting a failure of the first compute node (218), computer program instructions for failing over to the second compute node (220), and so on. The managing compute node (204) of FIG. 2 may be embodied as a fully functional compute node that is similar to the first compute node (218) and the second compute node (220), as a data communications switch for directing messages to and from the first compute node (218) and the second compute node (220), and in other ways as will occur to those of skill in the art.

The example method of FIG. 2 includes determining (206), by a managing compute node (204), whether the first compute node (218) and the second compute node (220) each have a local cache (222, 224). In the example method of FIG. 2, the managing compute node (204) may retain information describing hardware installed on the first compute node (218) and the second compute node (220), information describing software installed on the first compute node (218) and the second compute node (220), and so on. Determining (206) whether the first compute node (218) and the second compute node (220) each have a local cache (222, 224) may therefore be carried out by inspecting the information describing hardware installed on the first compute node (218) and the second compute node (220). Alternatively, determining (206) whether the first compute node (218) and the second compute node (220) each have a local cache (222, 224) may be carried out by sending a message to each node (218, 220) requesting information describing hardware installed on each node (218, 220).

The example method of FIG. 2 also includes combining (210), by the managing compute node (204), local cache (222) on the first compute node (218) and local cache (224) on the second compute node (220) into unified logical cache. In the example method of FIG. 2, the unified logical cache can represent cache that is available for use by the first compute node (218), thereby expanding the amount of cache available to the first compute node (218). Consider an example in which the first compute node (218) and the second compute node (220) each have a 500 MB cache. In such an example, combining (210) local cache (222) on the first compute node (218) and local cache (224) on the second compute node (220) into unified logical cache results in a 1 GB cache that is available for use by the first compute node (218). In such an example, rather than mirroring the local cache (222) of the first compute node (218) in the local cache (224) of the second compute node (220), the first compute node can actively use the local cache (224) of the second compute node (220). In the example method of FIG. 2, combining (210) local cache (222) on the first compute node (218) and local cache (224) on the second compute node (220) into unified logical cache is carried out in response to affirmatively (208) determining that the first compute node (218) and the second compute node (220) each have a local cache (222, 224).

The example method of FIG. 2 also includes receiving (214), by the managing compute node (204), a memory access request (202). In the example method of FIG. 2, the memory access request (202) may be embodied as a request to read data from a location in memory of the first compute node (218). As such, the memory access request (202) can include a memory address (203) specifying a location in memory to read data from. The memory access request (202) may be received, for example, from other computers that are coupled to the managing compute node (204) by a data communications network.

The example method of FIG. 2 also includes sending (216), by the managing compute node (204), the memory access request (202) to an appropriate local cache (222, 224) in the unified logical cache. As described above, some portion of the unified logical cache physically resides on the first compute node (218) and some other portion of the unified logical cache physically resides on the second compute node (220). As such, assuming that the memory access request (202) can be serviced by the unified logical cache, the memory access request (202) should be sent (216) to the compute node (218, 220) that physically contains the portion of the unified logical cache that will be used to service the memory access request (202). In the example method of FIG. 2, sending (216) the memory access request (202) to an appropriate local cache (222, 224) in the unified logical cache may therefore be carried out by initially sending the memory access request (202) to the first compute node (218). In such an example, if a cache miss occurs then the memory access request (202) may subsequently be sent to the second compute node (220). Alternatively, sending (216) the memory access request (202) to an appropriate local cache (222, 224) in the unified logical cache may be carried out by simultaneously sending the memory access request (218) to both compute nodes (218, 220).

Readers will appreciate that in the event that a particular compute node (218) fails in a two compute node (218, 220) configuration, the unified cache that is formed by the local cache (222) on the first compute node (218) and the local cache (224) on the second compute node (220) does not fail entirely. When the local caches (222, 224) of two compute nodes (218, 220) operate as a single unified cache, in the event of a failure of one of the two compute nodes (218, 220), the local cache of the operational compute node can be populated with data and still be utilized as a cache. The local cache of the operational compute node may be significantly smaller that the single unified cache, but would still act as an affective accelerator for data processing operations. As such, embodiments of the present invention provides for performance protection even in the event of a compute node failure as cache memory is physically located in two or more locations and can exist even when one compute node fails.

Figure 3:
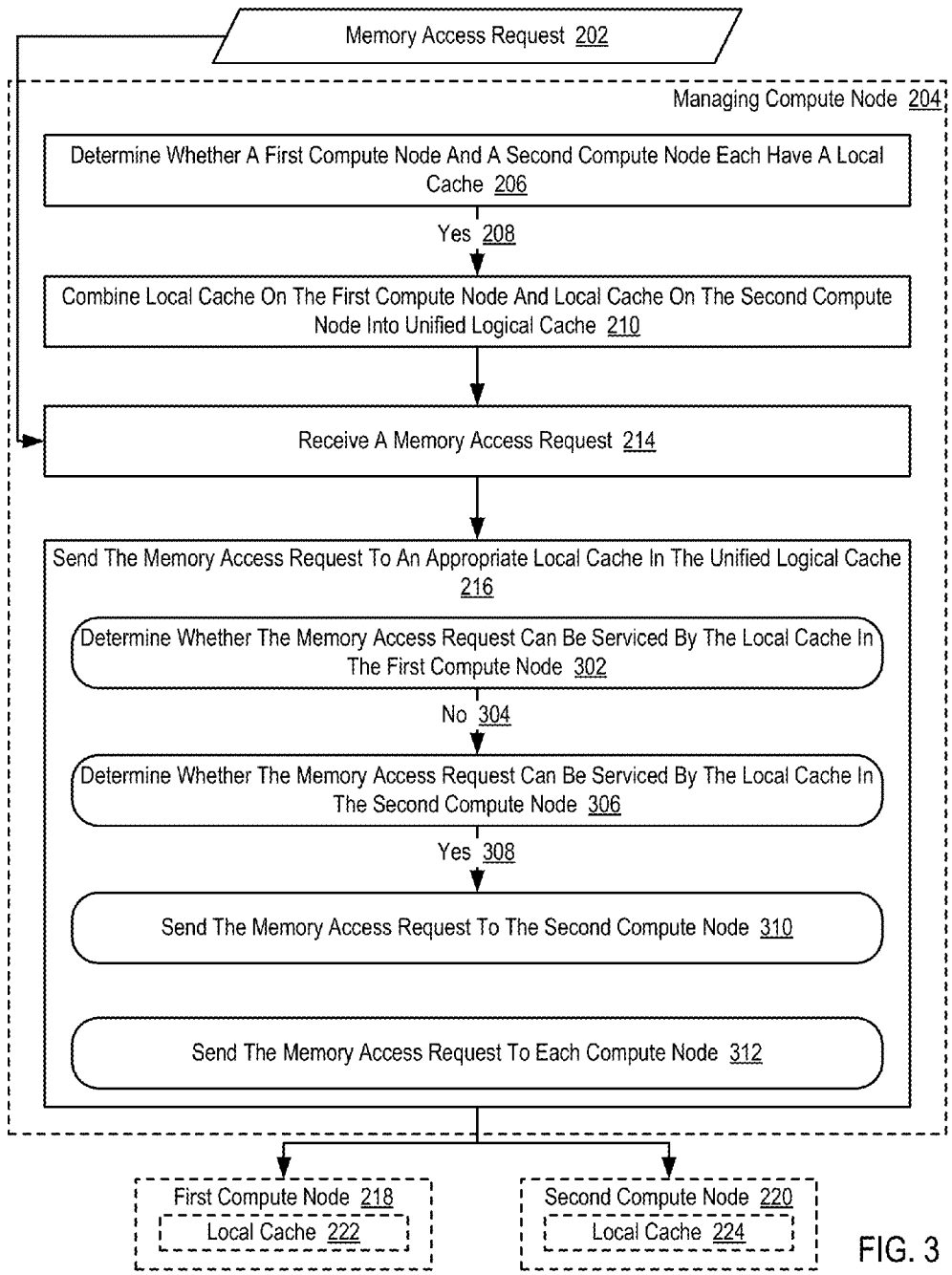
FIG. 3 sets forth a flow chart illustrating an additional example method for sharing local cache from a failover node according to embodiments of the present invention.

For further explanation, FIG. 3 sets forth a flow chart illustrating an additional example method for sharing local cache from a failover node according to embodiments of the present invention. The example method of FIG. 3 is similar to the example method of FIG. 2 as it also includes determining (206) whether a first compute node (218) and a second compute node (220) each have a local cache (222, 224), combining (210) local cache (222) on the first compute node (218) and local cache (224) on the second compute node (220) into unified logical cache, receiving (214) a memory access request (202), and sending (216) the memory access request (202) to an appropriate local cache (222, 224) in the unified logical cache.

In the example method of FIG. 3, sending (216) the memory access request (202) to an appropriate local cache (222, 224) in the unified logical cache may be carried out by determining (302) whether the memory access request (202) can be serviced by the local cache (222) in the first compute node (218). In the example method of FIG. 3, determining (302) whether the memory access request (202) can be serviced by the local cache (222) in the first compute node (218) may be carried out, for example, by sending a memory address specified on the memory access request (202) to the first compute node (218) so that the first compute node (218) can examine its local cache (222) to determine if servicing the memory access request (202) would result in a cache hit or a cache miss in the local cache (222). If servicing the memory access request (202) would result in a cache miss in the local cache (222), it can be determined that the memory access request (202) cannot (304) be serviced by the local cache (222) in the first compute node (218).

In the example method of FIG. 3, sending (216) the memory access request (202) to an appropriate local cache (222, 224) in the unified logical cache may further be carried out by determining (306) whether the memory access request (202) can be serviced by the local cache (224) in the second compute node (220). In the example method of FIG. 3, determining (306) whether the memory access request (202) can be serviced by the local cache (224) in the second compute node (220) is carried out in response to determining that the memory access request (202) cannot (304) be serviced by the local cache (222) in the first compute node (218). In the example method of FIG. 3, determining (306) whether the memory access request (202) can be serviced by the local cache (224) in the second compute node (220) may be carried out, for example, by sending a memory address specified on the memory access request (202) to the second compute node (220) so that the second compute node (220) can examine its local cache (224) to determine if servicing the memory access request (202) would result in a cache hit or a cache miss in the local cache (224). If servicing the memory access request (202) would result in a cache hit in the local cache (224), it can be determined that the memory access request (202) can be serviced by the local cache (224) in the second compute node (220). In the example method of FIG. 3, sending (216) the memory access request (202) to an appropriate local cache (222, 224) in the unified logical cache may therefore be carried out by sending (310) the memory access request (202) to the second compute node (220) in response to affirmatively (308) determining that the memory access request (202) can be serviced by the local cache (224) in the second compute node (220).

In the example method of FIG. 3, sending (216) the memory access request (202) to an appropriate local cache (222, 224) in the unified logical cache may alternatively be carried out by sending (312) the memory access request (202) to each compute node (218, 220). As an alternative to sequentially determining (302) whether the memory access request (202) can be serviced by the local cache (222) in the first compute node (218) and determining (306) whether the memory access request (202) can be serviced by the local cache (224) in the second compute node (220), the managing compute node (204) may simply send (312) the memory access request (202) to each compute node (218, 220). In such an example, if either compute node (218, 220) has a copy of the requested data in its local cache (222, 224), the compute node (218, 220) with the copy of the requested data in its local cache (222, 224) will be able to respond to the memory access request (202) much faster than the compute node (218, 220) that does not have a copy of the requested data in its local cache (222, 224). As such, the managing compute node (204) may be configured to process the first response to the memory access request (202) and ignore any subsequent responses to the memory access request (202). In addition, because the second compute node (220) is operating as a failover node, the second compute node (220) may be configured to only respond to a memory access request (202) when the second compute node (220) can service the memory access request (202) using its local cache (224).

Figure 4:
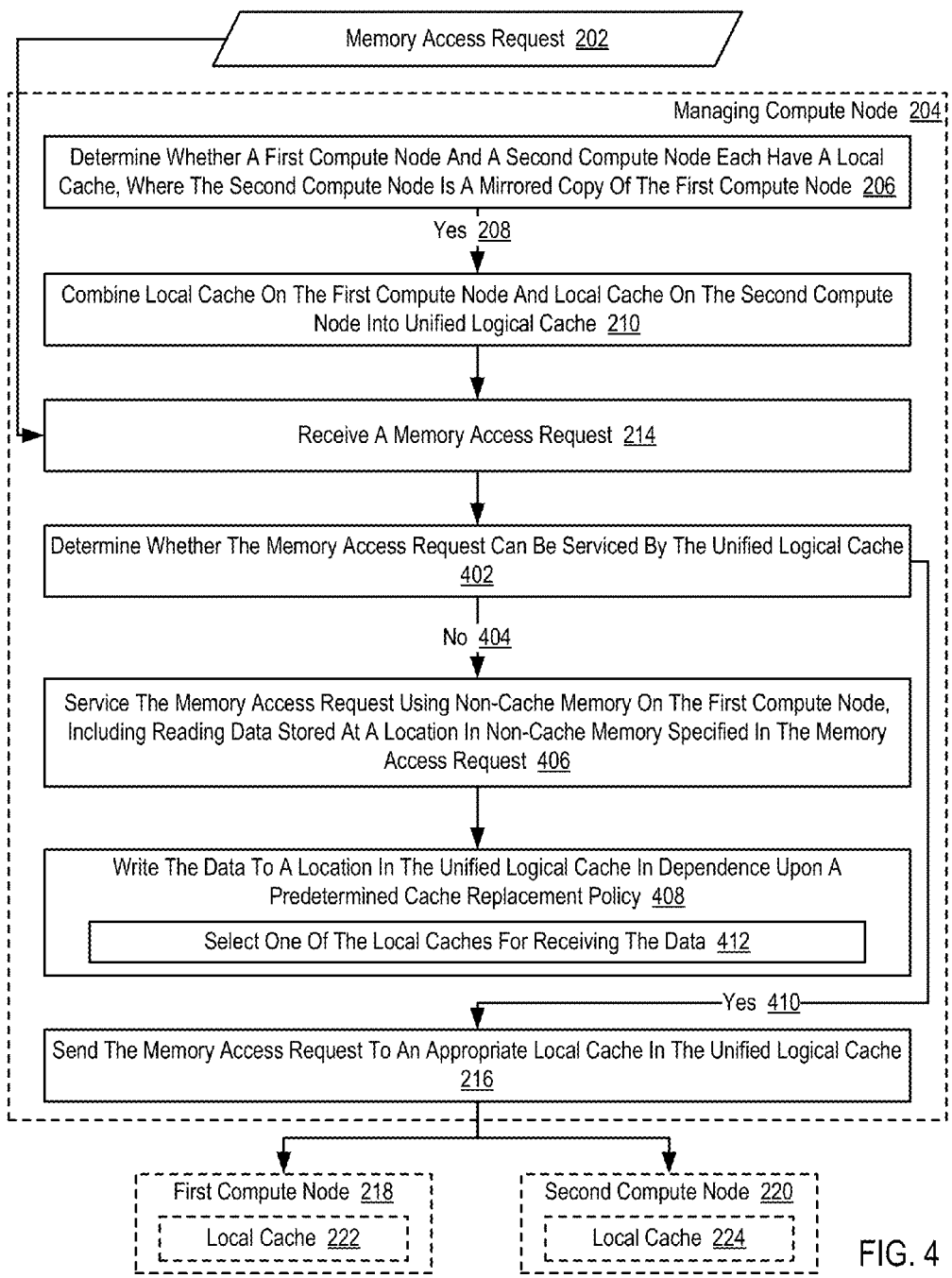
FIG. 4 sets forth a flow chart illustrating an additional example method for sharing local cache from a failover node according to embodiments of the present invention.

For further explanation, FIG. 4 sets forth a flow chart illustrating an additional example method for sharing local cache from a failover node according to embodiments of the present invention. The example method of FIG. 4 is similar to the example method of FIG. 2 as it also includes determining (206) whether a first compute node (218) and a second compute node (220) each have a local cache (222, 224), combining (210) local cache (222) on the first compute node (218) and local cache (224) on the second compute node (220) into unified logical cache, receiving (214) a memory access request (202), and sending (216) the memory access request (202) to an appropriate local cache (222, 224) in the unified logical cache.

The example method of FIG. 4 also includes determining (402) whether the memory access request (202) can be serviced by the unified logical cache. In the example method of FIG. 4, determining (402) whether the memory access request (202) can be serviced by the unified logical cache may be carried out, for example, by determining whether servicing the memory access request (202) by either the first compute node (218) or the second compute node (220) would result in a cache hit in the local cache (222, 224) of either compute node (218, 220). If both compute nodes (218, 220) would experience a cache miss when servicing the memory access request (202), it can be determined (402) that the memory access request (202) cannot be serviced by the unified logical cache. If both compute nodes (218, 220) would not experience a cache miss when servicing the memory access request (202), however, it can be determined (402) that the memory access request (202) can (410) be serviced by the unified logical cache.

The example method of FIG. 4 also includes servicing (406) the memory access request (202) using non-cache memory on the first compute node (218). In the example method of FIG. 4, servicing (406) the memory access request (202) using non-cache memory on the first compute node (218) includes reading data stored at a location in non-cache memory specified in the memory access request (202). In the example method of FIG. 4, servicing (406) the memory access request (202) using non-cache memory on the first compute node (218) is carried out in response to determining that the memory access request (202) cannot (404) be serviced by the unified logical cache. Non-cache memory on the first compute node (218) may be embodied, for example, as a hard disk on the first compute node (218). In such an example, servicing (406) the memory access request (202) using non-cache memory on the first compute node (218) may be carried out, for example, by reading data stored at an address specified in the memory access request (202) from the non-cache memory on the first compute node (218).

The example method of FIG. 4 also includes writing (408) the data read from the non-cache memory in the first compute node (218) to a location in the unified logical cache in dependence upon a predetermined cache replacement policy. In the example method of FIG. 4, writing (408) the data to a location in the unified logical cache in dependence upon a predetermined cache replacement policy is also carried out in response to determining that the memory access request (202) cannot (404) be serviced by the unified logical cache. In the example method of FIG. 4, the predetermined cache replacement policy represents a set of rules used to determine where to place a block of data in a local cache. Because the unified logical cache includes local caches (222, 224) that are physically located in different compute nodes (222, 224), the predetermined cache replacement policy can include rules for selecting which local cache (222, 224) data should be written (408) to. As such, writing (408) the data to a location in the unified logical cache in dependence upon a predetermined cache replacement policy may include selecting (412) one of the local caches (222, 224) for receiving the data.

In the example method of FIG. 4, selecting (412) one of the local caches (222, 224) for receiving the data may be carried out using the predetermined cache replacement policy. For example, the predetermined cache replacement policy could select which local cache (222, 224) data should be written (408) to randomly, the predetermined cache replacement policy could select which local cache (222, 224) data should be written (408) to by alternating between each local cache (222, 224), the predetermined cache replacement policy could select which local cache (222, 224) data should be written (408) to by ranking each entry in the unified logical cache by frequency of access and placing the most frequently accessed cache lines in one local cache (222, 224) or distributing the most frequently accessed cache lines between the local caches (222, 224), and so on.

Example embodiments of the present invention are described largely in the context of a fully functional computer system for sharing local cache from a failover node. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
    by program instructions on a computing device,
    determining whether a first compute node and a failover compute node each have an internal cache, wherein the failover compute node is functioning as a mirrored copy of the first compute node;
    responsive to determining that the first compute node and the failover compute node each have an internal cache, combining into a unified logical cache, a first internal cache of the first compute node and a second internal cache of the failover compute node;
    receiving a memory access request; and
    sending the memory access request to one of the internal caches in the unified logical cache including:
        determining whether the unified logical cache includes data requested by the memory access request; and
        responsive to determining that the unified logical cache includes data requested by the memory access request:
            servicing the memory access request using non-cache memory on the first compute node, including reading data stored at a location in non-cache memory specified in the memory access request; and
            writing the data to a location in the unified logical cache in dependence upon a predetermined cache replacement policy.

2. The method of claim 1 wherein writing the data to a location in the unified logical cache in dependence upon a predetermined cache replacement policy further comprises selecting one of the internal caches for receiving the data.

3. The method of claim 1 wherein the memory access request includes a memory address specifying a location in memory to read data from.

* * * * *